Inventor:
JACQUES GILBERT
BY
Kenyon & Kenyon
ATTORNEYS

United States Patent Office 3,391,058
Patented July 2, 1968

3,391,058
METHOD AND APPARATUS FOR CONTROLLING THE POWER OF A NUCLEAR REACTOR
Jacques Gilbert, Winterthur, Switzerland, assignor to Sulzer Brothers Limited, Winterthur, Switzerland, a corporation of Switzerland
Filed Aug. 31, 1965, Ser. No. 484,069
Claims priority, application Switzerland, Sept. 10, 1964, 11,796/64
6 Claims. (Cl. 176—22)

ABSTRACT OF THE DISCLOSURE

The control rods positioned intermediately within the reactor core control the power of the reactor. Upon movement of these intermediate rods into one of their end ranges, a corresponding number of rods either fully in or fully out of the reactor core move out or into the core. The intermediate control rods also control reactor output during movements of other rods of a closed loop into or out of the core.

---

The invention relates to a method of controlling the power of a nuclear reactor having a number of control rods movable axially into and out of the reactor core. In the method according to the invention, the adjusting movement of the control rods is such that some of the rods are always in one end position e.g. fully immersed in the reactor core while some other of the rods are in the other end position e.g. fully outside the reactor core; and at least one rod and at most two rods are simultaneously in an intermediate position between these two end positions.

The apparatus for controlling the power of a nuclear reactor according to the invention comprises a number of control rods which from a control and regulation point of view are interconnected to form a rod series. The control rods are connected to a reactor controller with a blocking means being provided therebetween which opens to allow the control signal to pass from the controller to a particular control rod in the rod series only when the rods on either side of the particular control rod which are separated by at least two rods are in opposite end positions.

It is known to control the power of nuclear reactors by control rods which contain a neutron-absorbing material. The rods are dipped or immersed into the reactor core to varying extents to control the neutron flux in the reactor and therefore the reactor power. In known reactor plants the control rods are divided into at least two groups—a coarse-adjustment group and a fine-adjustment group. The fine-adjustment rods deal with adjustments in instantaneous reactor power adjustments. The coarse adjustment rods compensate for slow changes in reactor core condition due e.g. to burn-up of the nuclear fuel, xenon effect and so on. As well as being complicated, a great disadvantage of the known system is that the partly immersed group of control rods leads to very uneven burn-up, since the partly immersed rods cause an irregular neutron flux in the reactor core.

It is an object of the invention to considerably reduce neutron flux irregularity in the reactor core and to provide very uniform burn-up of the nuclear fuel, with a simplification of the mechanism as compared with the known systems.

The invention will be described with reference to embodiments diagrammatically illustrated in the drawings wherein.

Figure 3:
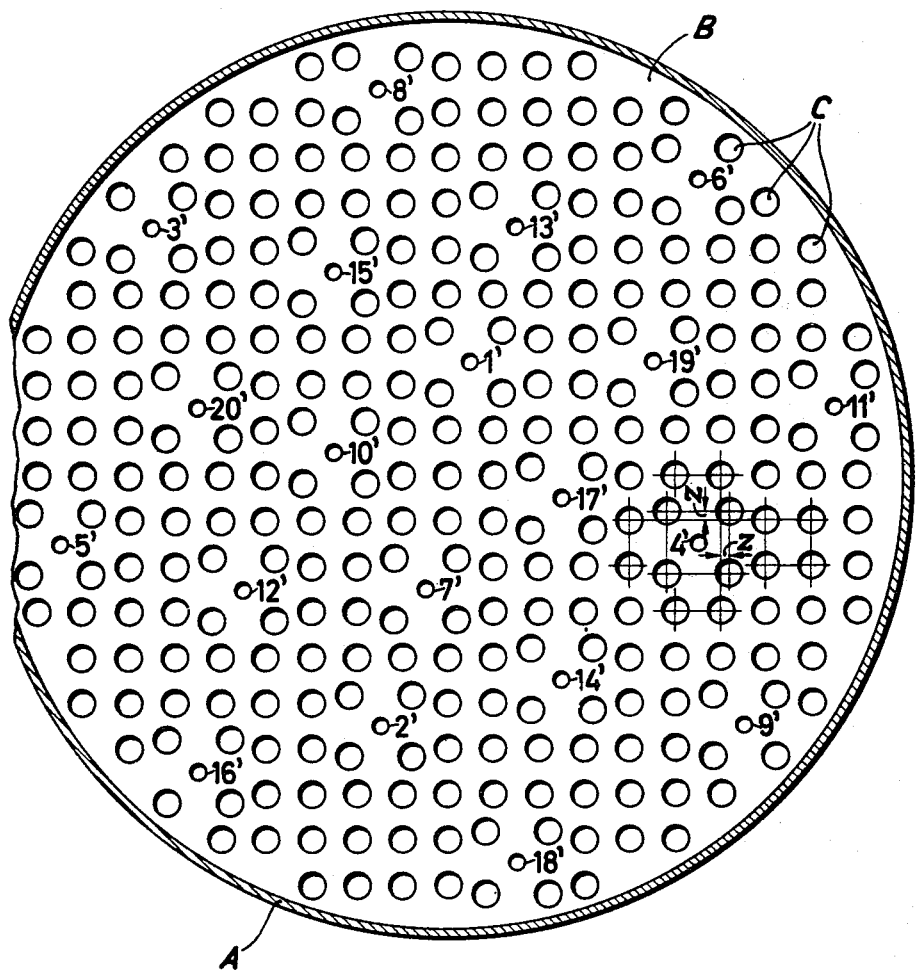
Figure 4:
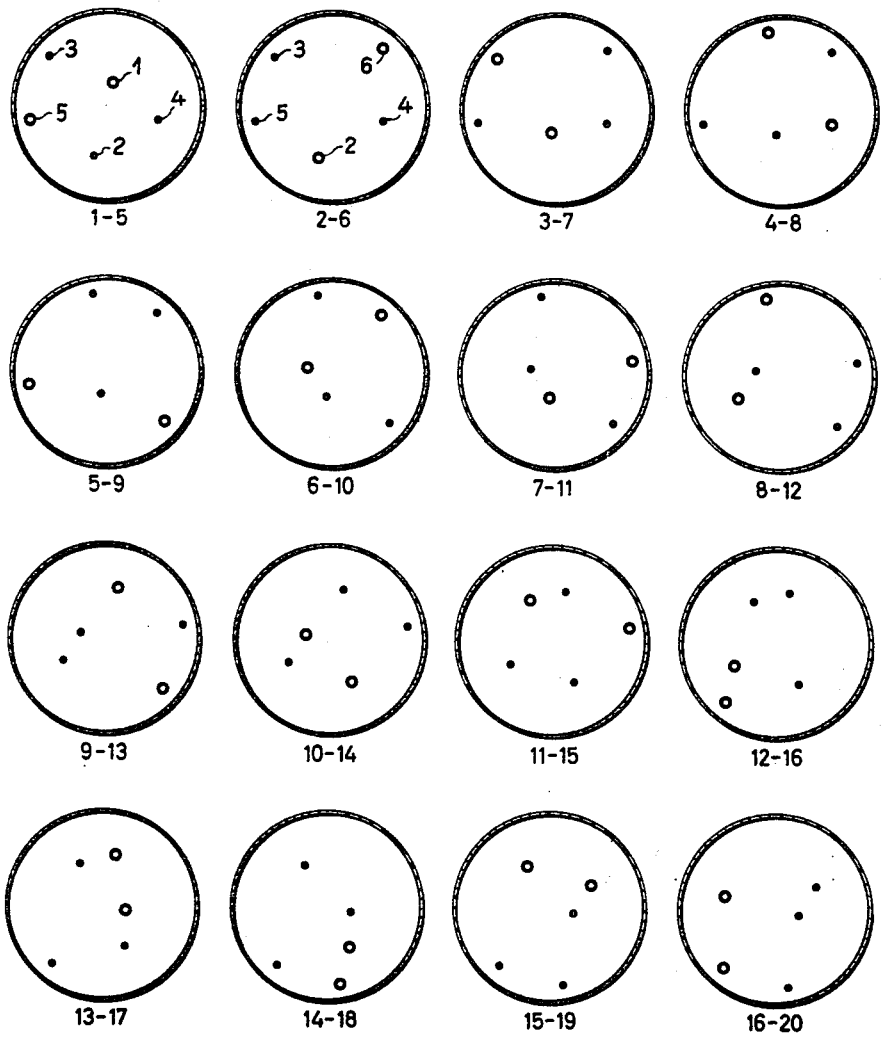

FIG. 3 is a cross-section through a reactor core according to the invention, the view being perpendicular to the axes of the control rod and fuel channels, and FIG. 4 shows, with reference to a number of reduced cross-sections corresponding to FIG. 3, the distribution of the immersed control rods in a system in which five out of twenty rods are immersed at any one time, the immersed rods being changed cyclically.

Figure 1:
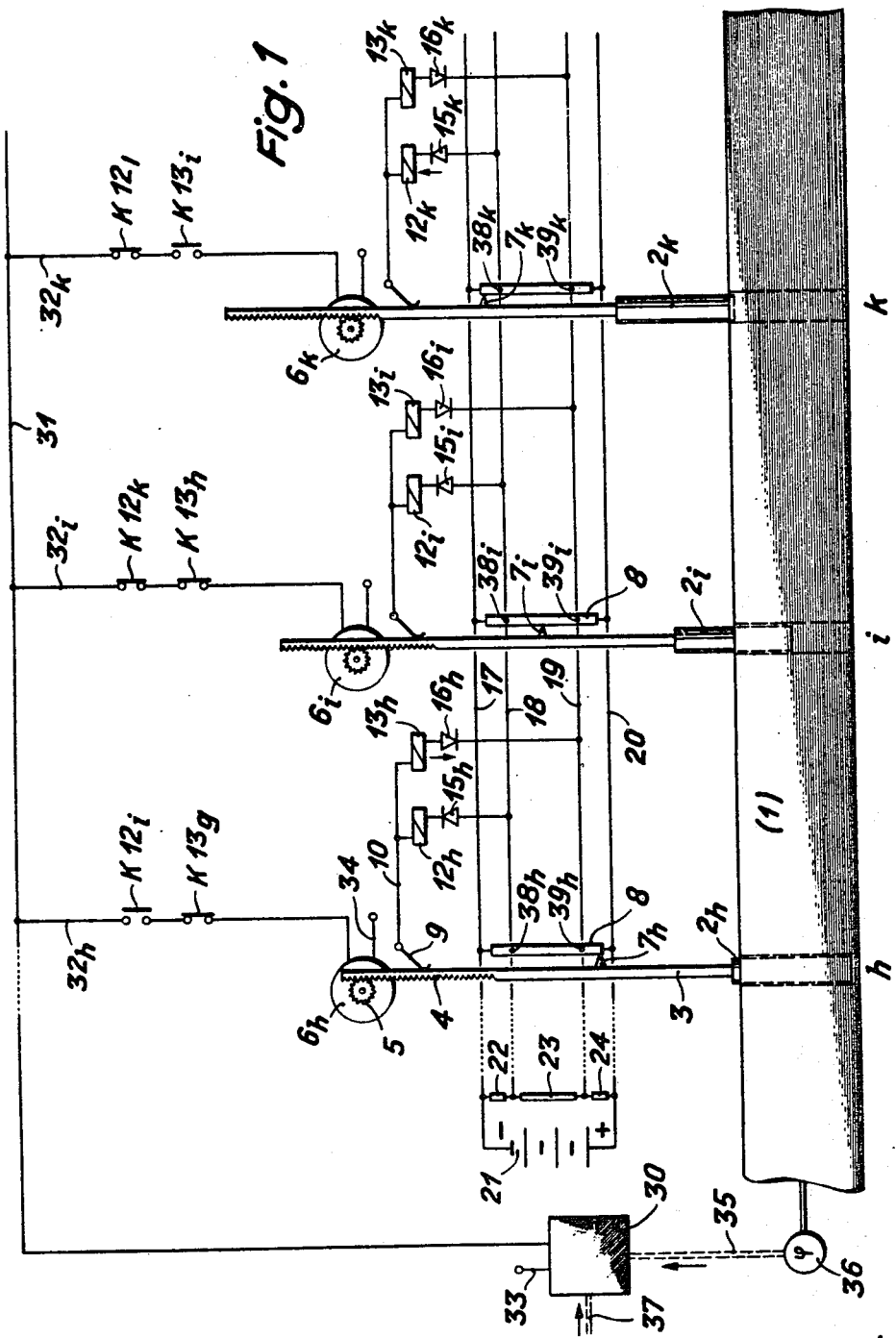
FIG. 1 is a simple diagram of the control rods of the reactor according to the invention, one rod being in the intermediate position.

A reactor core 1 shown diagrammatically in FIG. 1 comprises in known manner a nuclear fuel and moderator material and has a reactor coolant flowing through it in the form of a heat vehicle for removing the heat evolved therein to the outside of the reactor. In order not to overload the drawing, however, these items have been omitted from the drawing. Control rods 2 are adapted to dip into the core 1 and are connected, via racks 3 having teeth 4, to gearwheels 5 of electric servo-motors 6. The servo-motors are so devised that when two of them are connected simultaneously to the same voltage, they both run at the same speed and move the respective control rods 2 at the same speed.

Of a large number of control rods connected together to form a series $a$ to $n$, only three are shown in FIG. 1. To show the association between any particular item and any control rod shown, the corresponding parts of the control rods shown and their "circuitry" are, where applicable, given the index $h$ or $i$ or $k$. The control rod which is not shown but which is adjacent the rod $h$ in the sequence has the index $g$, and the rod which is not shown but which is adjacent the control rod $k$ has the index $l$.

Each rod 3 has a sliding or rubbing contact 7 moving on a resistance 8. The resistances 8 are connected to lines 17, 20 at a potential difference. The potential which the contacts 7 tap off from the resistances 8 goes via rubbing contacts 9 to lines 10. Connected thereto are two relays each 12, 13 connected via diodes 15, 16 to lines 18, 19. The same extend along the entire sequence of control rods and, together with the lines 17, 20 are connected to a chain of three resistances 22, 23, 24 to which the voltage of a D.C. source 21 is applied. The line 17 is connected to the negative pole, and the line 20 to the positive pole of the source 21. The ends of the resistances 8 are connected to the lines 17, 20. The diode 15 is arranged to pass only current flowing from the line 18 to the line 10, whereas the diode 16 passes only current from the line 10 to the line 19. The servo-motors 6 are energized from a controller 30 via a distribution line 31 and branch lines 32. The controller 30 and the servo-motors 6 have earth connections 33, 34 respectively. Contacts of the relays 12, 13 are disposed in the lines 32; the line 32 of one control rod receives the contact of the relay 12 of the rod on the right in the diagram, and the contact of the relay 13 of the rod on the left.

The elements 7–24 form sensors which make it possible to determine in which of three ranges, given by the relationship of the potentials of the lines 17–20, the particular control rod concerned is disposed. Of course, the relationship between control rod effectiveness and control rod position is represented by a curve which has a maximum at the centre of the movement range leading transversely through the reactor core and drops towards zero at the ends. The division into the three ranges is substantially such that two control rods which are disposed in the outer ranges and which are adjusted at the same speed produce substantially the same change in the neutron flux per unit of time as a single rod moving in the central range at the same speed.

The control rod sequence shown can be considered as an open chain in the example shown in FIG. 1. In this event, the first branch line 32a has a single contact set K12b and the last branch line 32n has a single contact set K13m. Conveniently, the sets K12a, K13n are connected to a warning system (not shown) indicating that the reactor control range is fully or almost exhausted downwards or upwards.

The controller 30 receives a measurement signal from a neutron flux meter 36 via a line 35 and a set-value signal via a line 37.

When the control rods are in the position shown in FIG. 1, the two relays 12, 13 associated with the central rod 2i are in the de-energized state since the voltage derived via the contact 7i is greater than the voltage in the line 18 and less than the voltage in the line 19. As an arrow indicating the direction of current flow shows, however, the relay 13 of the left-hand rod 2h is in the energized state since the voltage derived via the contact 7h is greater than the voltage in the line 19. There is therefore a flow of current via the contact 7h, rubbing contact 9, line 10, the winding of the relay 13h and the diode 16h to the line 19. Similar considerations apply to all those rods (not shown) which are on the left of the rod 2i and which are at the bottom end of the immersed range—i.e., which are fully immersed in the core. On the other hand, as the arrow denoting the flow of current indicates, the relay 12k of the fully "out" rod 2k is in the energized state since the voltage derived by the contact 7k is less than the voltage of the line 18. The relays 12 of all the rods forming part of the sequence after the rod 2k are similarly in an energized state. This stage of the relays is expressed in the lines 32 connected to the signal line 31 by the fact that, for all the rods to the left of the rod 2i in FIG. 1, the contacts k13 are in the closed state and the contacts k12 are open. In the lines 32 associated with the rods to the right of the rod 2i, the contacts k12 are in the closed state whereas the contacts k13 are open. Alone of all the lines 32, the line 32i has both the contacts k12, k13 closed. Consequently when the rods are in the state shown, a control signal, in the form of an electric current, from the controller 30 is supplied only to the servo-motor 6i of the rod 2i. Signal current polarity depends upon whether the measured neutron flux is above or below the set value, so that the hand to which the servo-motor rotates is determined correspondingly.

This is how the rod in the central range performs its control movements; the rods which are disposed before and after such rod in the sequence stay in opposite end positions. However, when the rod in the central range moves and passes by positions 38 or 39 on the resistance 8, voltage of such positions being equal to the voltage of the line 18 and 19 respectively, so that the rod concerned leaves the central range determined by these voltages, the particular relays 12, 13 concerned also operate. For instance, if the rod 2i rises and passes beyond the position 38i, the relay 12i operates and closes the contact k12i in the line 32h of the rod 2h. Thereafter the control signal also reaches the servo-motor of the rod 2h, the same moving in the same direction and at the same speed as the rod 2i. The movement continues until the contact 7h has passed beyond the position 39h on the resistance 8 and the relay 13h drops. At this time, at which the rod 2i has, moreover, reached its top end position, the contact K13h in the line 32i opens. Now only the rod 2h which has moved into the central range performs the control movement.

The arrangement operates correspondingly in the opposite direction—i.e., for a movement of the rod 2i from the position shown further into the core. When the contact 7i on the resistance 8 exceeds the potential of the line 19—i.e., moves to the end position determined thereby—the rod 2k starts to move, its movement being, as already stated, at the same speed and in the same direction. Consequently, there is either one rod in the central range of the adjusting movement or there are two rods in opposite end ranges. This feature helps to compensate for the reduced sensitivity of the control in the end ranges.

When the control rods are operated in accordance with this application and when the method according to this application is used to operate the control rods, no division of the rods is necessary into groups for coarse and fine control since the two functions are provided by the sequentially connected control rods. Since most of the rods are in their end positions and only a very small number of rods are in an intermediate position between the end positions, there is very little axial asymmetry in the neutron flux distribution such as is caused by the control rods of conventional systems. Correspondingly, there is a substantially equal burn-up of the nuclear fuel at its ends in the reactor core.

Figure 2:
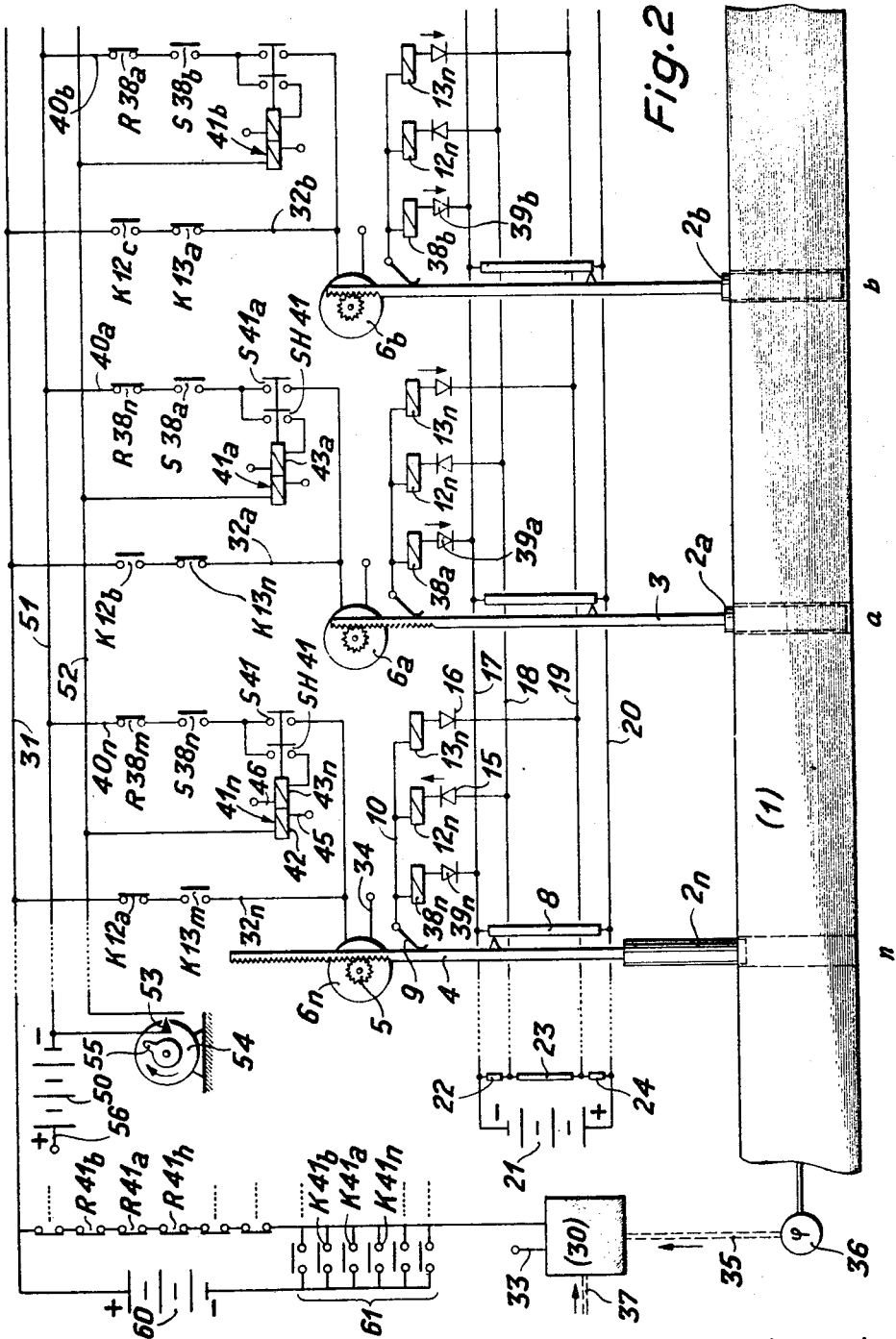
FIG. 2 is a control rod diagram amplified for further functions, at the boundary between the fully immersed and fully "out" rods of a sequence forming a closed loop.

Since the nuclear fuel near control rods which are completely immersed in the core all the time is used up relatively less than the fuel near rods which are fully "out," the position of the rods can be changed periodically. For instance, after the reactor has been stopped for a few months, the rod sequence can be altered so that, for instance, rods which were previously fully "in" now stay fully "out" for a time and vice-versa. Alternatively, the sequence of the rods can be left unchanged and the position of each rods in the intermediate position can be changed cyclically in the sequence. To this end, the open chain of control rods described with reference to FIG. 1 is closed so as to form a loop circuitwise. In this event, there must be a boundary somewhere between the fully "out" and the fully "in" rods. Referring to FIG. 2, a circuit arrangement will be described wherein this boundary shifts cyclicaly by one rod at a time after predetermined intervals of time. This feature is not limited just to reactors having a control of the kind shown in FIG. 1 and is basically of use for controls wherein there are a large number of rods in an intermediate position which perform the adjusting movements.

FIG. 2 shows the boundary between the final fully "out" rod 2n and the first fully "in" rod 2a; items already mentioned with reference to FIG. 1 have the same references. A relay 38 and a diode 39 are provided between the line 10 and the line 17 associated with each rod. Each relay 38 has a normally closed (nc) contact R38 and a normally open (no) contact S38. These two contacts are connected in a line 40 which connects to the associated servo-motor 6 a line 51 common to the whole sequence. The arrangement of the contacts is such that the no contact S38 is disposed in the line 40 of that particular rod to whose line 10 the relay 38 is connected. The nc contacts, R38, however, are disposed in the line 40 of the rod which is immediately to the right in the rod sequence. A no contact S41 of a stick relay 41 comprising two windings—a main winding 42 and a stick winding 43—is also disposed in the line 40. The main wnding 42 is connected via a line 44 to a line 52 common to the whole sequence. The other end of the winding 42 is connected to an earth connection 45. The stick winding 43 is supplied from the line 40 via a stick contact SH41. The other end of the winding 43 is earthed via a connection 46. The line 51 is connected to the negative pole of a power supply 50. The line 52 is connected to the supply 50 via a contact 53 operated by a cam 55 moved by a motor 54. The positive pole of the supply 50 is earthed via a connection 56.

As already stated, the control rods of the arrangement shown in FIG. 2, instead of forming a series as described with reference to FIG. 1, form a closed loop. FIG. 2 shows the place where the "series" is joined together to form the loop—i.e., the place where the first of the "in" rods, which have the index a, is adjacent the last of the "out" rods, which have the index n. Neutron flux control in this system is exactly the same as already described with reference to FIG. 1, being provided by one or two intermediately positioned rods which are disposed somewhere between the rod 2b and the rod 2n in accordance with control requirements.

In the arrangement shown in FIG. 2, the motor 54 in its rotation closes the contact 53 to transmit a signal to the line 52. All the relays 41 therefore pick up and close their contacts S41, SH41. However, a stick effect by the winding 43 can be provided only for that rod for which both the contacts R38 and S38 in the associated line 40 have been closed. In the example shown in FIG. 2, this applies to the first "in" rod, the rod 2a. After the brief pulse in the line 52 has decayed, therefore, all the relays 41 drop except for the relay 41a. The stick contact SH41 thereof keeps the winding 43 energized and therefore keeps the contacts S41a in the closed state. Consequently, current flows from the line 51 and power supply 50 to the servo-motor 6a to start the same. The polarity of the source 50 is so devised that the motor 6a makes the rod 2a rise—i.e., move out of the core. The rod 2a continues to move until it has reached the top end position and the relay 38a drops. The contact S38a therefore opens to interrupt the energization of the winding 43 of the stick relay 41a. The rod 2a stops in its top end position. The dropping of the relay 38a causes the nc contact R38a in the line 40b to close, in preparation for the same operation to be repeated for the rod 2b when the next pulse is applied to the line 52.

The control arrangement described in FIG. 1 compensates for the disturbance to control rod adjustment caused by the rod 2a moving out in the manner described. In other words, as the rising movement of the rod 2a begins, the rod in the intermediate position, e.g. the rod 2i in FIG. 1, is moved into the core by the controller 30 and, for instance, if reactor power is unchanged, the rod 2k takes over the control function of the rod 2i. There has therefore been a shift of one member in the sequence of control rod adjustment, provided that the movement of the rod adjusted during the cyclic change—the rod 2a in the case described—proceeds slowly enough for the control to follow.

The motor 54 can provide the cyclic control rod adjustment at regular intervals. The time intervals between two consecutive adjustments can be minutes or even days. If the time intervals are long it may be convenient, for instance, for the motor 54 to be controlled by a time relay so as to rapidly perform one single revolution at a time. However, other known systems for transmitting a current pulse can, of course, be used instead. The rods can be adjusted cyclically at even intervals or possibly even at irregular intervals corresponding to burn-up in various parts of the reactor e.g. on the basis of delivered energy (kwh.). As already mentioned, moving a rod out during position changing upsets the control of the reactor, the control reacting with some inertia on neutron flux variation. The arrangement shown in FIG. 2 therefore has extra provision to reduce any such disturbance. The extra provision comprises a power supply 60 which has the same potential as the power supply 50 but which is connected to the signal line with a polarity opposite to that with which the supply 50 is connected to the line 51. The power supply 60 can be connected to the output line of the controller 30 via a set of no contacts K41 of all the relays 41. Also, nc contacts R41 of all the relays 41 are disposed in the controller output line in parallel with the supply 60. When none of the relays 41 is in the energized state, the reactor control proceeds as described with reference to FIG. 1, the controller output line being connected to the signal line 31 via the nc contacts R41. When any of the relays 41 picks up during a cyclic change of position, the particular no contact K41 concerned closes and the corresponding nc contact R41 opens. The power supply 60 is therefore connected into the signal line 31. The controller signal therefore has superimposed upon it a compensating signal which, independently of the actual value delivered by the neutron flux meter 36, moves each rod actually providing the controlling action, in the opposite direction and at the same speed as the rod which moves out during position changing. Of course, the controlling action of the controller 30 also helps to compensate for any changes which occur in the neutron flux during these events.

FIG. 3 is a diagrammatic view in cross-section of the reactor core, there being visible an outer shell or casing A, a moderator portion B and apertures C, to the number of 293, for the fuel rods. The smaller circles numbered 1' to 20' are the control rod apertures, the numbering also representing the association of the rods in the sequence shown in FIGS. 1 and 2. An interesting feature is that around a control rod the fuel rods are staggered by small amounts z from the normal lattice or mesh, to make neutron flux distribution more uniform. The idea underlying the distribution of the rods in FIG. 2 and their arrangement in the sequence as denoted by the numbering is to ensure that, for a given number of rods immersed in the core, the neutron flux is distributed very uniformly in the reactor and that the next rod to be immersed is always the rod near the greatest neutron density—i.e., the greatest rod-free zone.

FIG. 4 is an analysis of the control rod distribution shown in FIG. 3, for the case in which five rods are immersed at any one time. The first rod and last rod are represented by circles and the other rods are represented by dots.

The features according to the application as hereinbefore described obviate asymmetrical neutron flux distribution in the reactor core and therefore lead to uniform burn-up of the fuel axially of the control rods; the arrangement shown in FIG. 3 and the periodic changing of position over the core cross-section contribute to the same purpose.

What is claimed is:
1. A nuclear reactor comprising
   a reactor core,
   a first group of control rods movably mounted in a fully submerged position in said reactor core,
   a second group of control rods movably mounted in a fully emerged position outside said reactor core,
   a single control rod movably mounted intermediately in an intermediate position within said reactor core, and
   controller means interconnecd to said control rods for cyclically moving said control rods from one of said positions into one of the others of said positions to control the power of the nuclear reactor, said controller means including a first means for alternately permitting movement of the control rods of one of said first and second groups simultaneously with said single control rod.

2. A nuclear reactor as set forth in claim 1 wherein said control rods are sequentially connected in a closed loop circuit and said single control rod is disposed between said first and second groups of control rods, said nuclear reactor further comprising a second means for moving one of said control rods of one of said groups into the other of said groups simultaneously with and in opposition to said single control rod, said one rod being positioned adjacent said other of said groups.

3. A nuclear reactor as set forth in claim 2 further comprising an adjustment means for emitting an adjustment signal upon movement of said one of said control rods, said adjustment means superimposing said signal on said controller means to move said single rod at the same speed as said one of said control rods in an opposite direction whereby any disturbance in control of the nuclear reactor caused upon movement of said one of said control rod is counteracted.

4. A nuclear reactor as set forth in claim 1 wherein the control rods of said groups of control rods are distributed in a manner wherein the control rods of said second groups move sequentially into the reactor core in the middle of the greatest rod-free zone of the reactor core.

5. A nuclear reactor as set forth in claim 1 wherein said controller means further includes second means for transmitting a signal responsive to the output of said reactor core to each of said control rods to move said control rods in response thereto, said first means being interconnected with said second means to interrupt the transmission of said signal to each of said control rods in said first and second groups during movement of said control rods of said third group through a central range disposed between a pair of end ranges in said reactor core.

6. A nuclear reactor as set forth in claim 5 wherein said first means additionally permits transmission of said signal to the control rods of one of said first and second groups during movement of said single control rod through one of said end ranges.

References Cited

FOREIGN PATENTS 845,207    3/1960    Great Britain.
848,521    9/1960    Great Britain.

BENJAMIN R. PADGETT, *Primary Examiner.*

L. DEWAYNE RUTLEDGE, *Examiner.*

H. E. BEHREND, *Assistant Examiner.*